May 3, 1955  K. E. PEILER  2,707,621
FRONT BLENDER
Filed Dec. 11, 1952

INVENTOR
KARL E. PEILER
BY Bates + Willard
ATTORNEYS

United States Patent Office 2,707,621
Patented May 3, 1955

2,707,621

FRONT BLENDER

Karl E. Peiler, West Hartford, Conn., assignor to Emhart Manufacturing Company, Hartford, Conn., a corporation of Delaware Application December 11, 1952, Serial No. 325,347

5 Claims. (Cl. 259—6)

This invention relates to improvements in means for and methods of stirring and impelling molten glass in a glass feeder forehearth or the like in an attempt to obtain desirable uniformity of temperature and condition of the glass passing to a feed outlet or place of removal of molten glass.

The portions of a stream or body of molten glass in a forehearth next to its bottom and side walls tend to be cooler and more sluggish or viscous than the remainder thereof. The hotter, less viscous glass will flow more rapidly than the cooler, more viscous glass. Stratification results from these and other causes. In addition to being non-uniform in temperature throughout its cross section at any given place along the forehearth, the glass stream or body therein may be inhomogeneous because of streaks of refractory-contaminated glass or glasses of different compositions therein or for other causes.

An object of the present invention is effectually to break up stratification and effect thorough mixing and blending at a predetermined place along a forehearth channel of the different strata and inhomogeneous portions of a supply body or stream of molten glass in such channel, whereby to provide approximate uniformity of temperature and viscosity of the glass at all levels in the supply body or stream as well as a more nearly homogeneous condition thereof.

A practical embodiment of the invention may comprise a pair of individually rotatable vertical glass stirring and impelling implements respectively depending into the glass of a supply body or stream in a forehearth nearly to the bottom thereof and in adjacent, working relation to the vertical walls of opposite recesses or bays in the side walls of the forehearth channel. These implements may be of the type disclosed in Patent No. 2,563,099, of August 7, 1951, to M. M. Cannon, Jr., each being formed with a spiral glass impelling thread or ridge extending on the portion thereof immersed in the glass from the bottom end of the implement nearly to the surface of the glass. By co-action with the wall of the associate recess, such an implement, when rotated about its vertical axis, will pump glass either up or down according to the hand of the implement thread and the direction of the rotation of the implement. Also, there will be a tendency to cause a circulatory movement of glass transversely of the supply body or stream and in a vertical plane at the side of the implement remote from the co-operative wall of the associate recess. When two implements of the same hand respectively are disposed in association with opposite recesses in the respective side walls of the forehearth channel and are rotated in opposite directions about their individual axes, as is preferred, glass will be impelled vertically upward at one side of the forehearth channel and vertically downward at the other and the circulatory movement of glass of the supply body or stream between the implements in a transverse vertical plane will be aided by the rotation of both implements. This will assure an effective breaking up of strata and inhomogeneous portions of the supply body or stream and mixing and blending of the glass thereof so as to become more nearly uniform in temperature and in viscosity and also more nearly homogeneous from the top to the bottom and from one side to the other of the glass supply body or stream.

The implements preferably are placed in the equalizing or conditioning section of a glass feeder forehearth. This is the section immediately preceding the feed spout or other glass delivery section of the forehearth. The average temperature of the glass of a cross-section of the supply body or stream entering the equalizing or conditioning section should, in normal operation of the feeder, closely approximate the temperature desired for the glass charges to be fed or otherwise removed from the glass feeder.

Other objects and advantages of the invention hereinafter will be pointed out or will become apparent from the following description of a practical embodiment of the invention, as shown in the accompanying drawings, in which.

Figure 1:
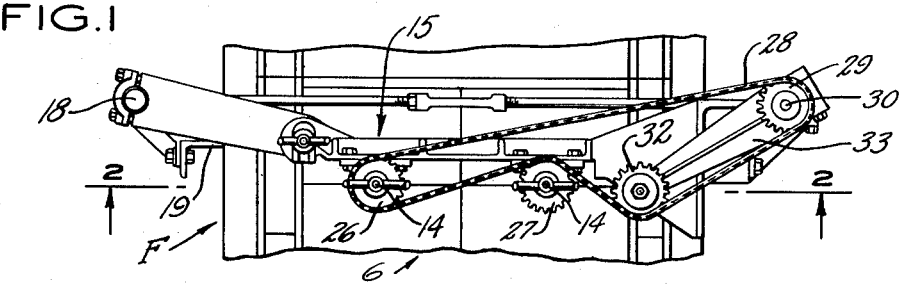
Fig. 1 is a plan view of a fragmentary portion of a feeder forehearth equipped with molten glass stirring and impelling means of the present invention.
Figure 2:
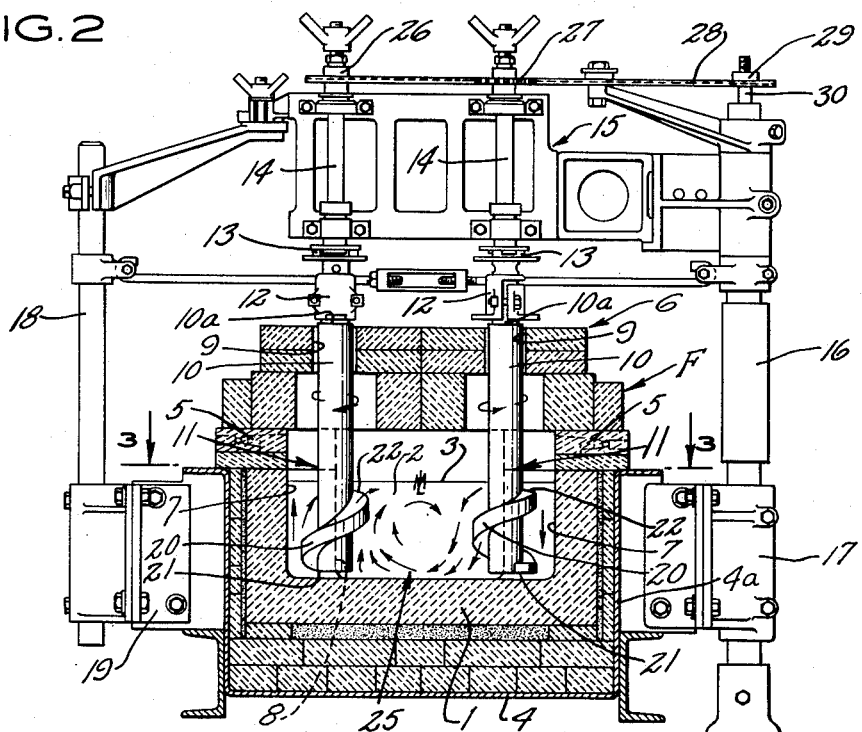
Fig. 2 is a vertical section along the line 2—2 of Fig. 1 with the stirring and impelling implements and their supporting and operating means shown in elevation.
Figure 3:
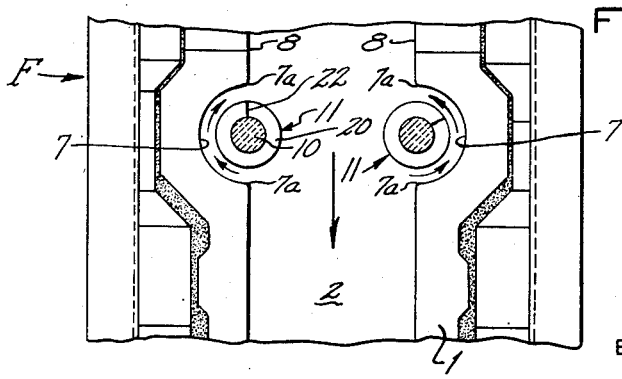
Fig. 3 is a plan view of a section along the line 3—3 of Fig. 2.

In the drawings, a fragmentary portion of a feeder forehearth is designated F, Figs. 1, 2 and 3. This includes a suitable refractory substantially horizontal glass flow channel 1 of generally U-shape in cross section. In practice, a stream or body of molten glass 2 from a melting tank furnace or other source of supply (not shown) fills the forehearth channel to a predetermined level, designated ML, known as the "metal line" and as indicated at 3 in Fig. 2. The forehearth channel may supply molten glass to a feed spout provided with a bottom outlet. It is unnecessary to show these and other conventional parts of a glass feeding apparatus since they do not, per se, form part of the present invention.

The forehearth flow channel 1 is suitably bedded within a metal casing 4, Fig. 2, which is supported by means, not shown, so as to occupy a suitable position for its intended purpose.

The side walls of the glass flow channel 1 may be surmounted by rows of burner blocks 5 and these in turn may provide support for a forehearth channel roof or cover structure 6. These parts are formed of suitable refractory materials and of suitably arranged blocks or component parts.

Figure 4:
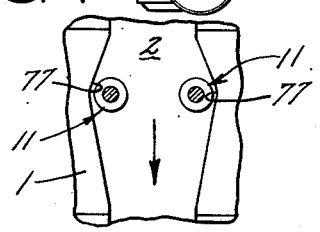
Fig. 4 is a fragmentary view similar to Fig. 4 but on a smaller scale, showing a modified form of forehearth channel.

In carrying out the invention, the upstanding sides of the forehearth channel are formed or otherwise provided with opposite recesses 7. In the example shown, these extend from the bottom of the forehearth channel for the full height of the side walls thereof as shown by Fig. 2. As shown by Fig. 3, they are approximately semi-circular in horizontal configuration and thus have relatively sharp vertical corner portions 7a where they are merged at their side edges into the inner surfaces 8 of the side walls of the channel proper. These may be eliminated by forming the recesses so that their walls merge gradually into the side surfaces of the channel side walls proper to offer no substantial obstruction to linear movement of portions of the glass stream or supply body moving next to the side walls of the forehearth channel into the recesses and from the recesses into the channel proper. Recesses as just described are indicated at 77 in Fig. 4 and are advantageous for use in a forehearth which may be operated at any time without co-acting and impelling implements as hereinafter described. Recesses of still other configurations may be used if desired.

The forehearth channel roof or cover structure is provided with vertical openings 9, Fig. 2, to accommodate the shanks 10 of refractory stirring and impelling implements generally designated 11. These shanks have extreme upper end portions 10a firmly held in chucks 12 located above the level of the forehearth channel roof or cover, the chucks being connected by couplings 13 to the lower ends of individually rotatable vertical shafts or spindles 14 carried by a supported overhanging arm or frame 15. The overhanging supporting arm 15 extends transversely across the forehearth channel roof or cover, being supported and positioned in a predetermined relation thereto by any suitable known means. In the example shown, such means comprises a tubular supporting structure 16 carried by a bracket 17 fastened to a side portion 4a of the forehearth casing 4 so as to extend vertically at one side of the forehearth structure F to a level above that of the forehearth roof or cover 6. The arm 15 is mounted at one end on the upper end portion of tubular structure 16 and may be fastened at its opposite end to a vertical standard 18 which is carried by a bracket structure 19 at the opposite side of the forehearth. The supporting arrangement for the stirring and impelling implements as shown is substantially as disclosed in my Patent No. 2,586,079 of February 19, 1952, to which reference may be made for further details if desired.

The supporting arrangement is such that the stirring and impelling implements depend through the openings 9 in the forehearth roof or cover nearly to the bottom of the forehearth channel with the lower glass immersed portions of such implements in adjacent, working relation to the walls of the recess 7 or 77, as the case may be, in the side walls of the forehearth channel. The lower glass immersed portion of each of these implements is formed with a spiral glass impelling thread or projection 20 extending on the implement shank from its lower end for part of its length. The pitch of spiral thread or projection 20 preferably is relatively coarse or large so that with only about a full turn of the thread around the implement shank, its vertical extent will be from a level about that of the lower end of the implement to a level but slightly below the surface of the molten glass stream in the forehearth channel. A finer or smaller pitch of thread and more than one turn thereof may of course be employed. The screw threaded glass stirring and impelling implement may be substantially the same as that which is disclosed in Patent No. 2,563,099 of August 7, 1951, to M. M. Cannon, Jr.

As shown in Fig. 2, the lower end of the spiral thread or projection 20, which is substantially flush with the bottom end of the implement shank as indicated at 21, is near the bottom of the forehearth channel. The extreme upper end of the implement spiral thread or projection, indicated at 22, is only slightly below the surface of the glass stream or supply body in the forehearth channel. The immersed glass impelling and stirring portion or head of the implement is partly in a recess and in adjacent, spaced working relation to the wall of such recess. When the implement is rotated about its vertical axis, glass between these two parts will be pumped or impelled vertically, either upward as indicated for the left hand implement in Fig. 2 or downward as indicated for the right hand implement in the same view. The direction of this vertical pumping or propulsion of glass will, of course, depend upon the hand of the screw threaded stirring and impelling head and the direction of its rotation. As shown in Fig. 2, the left hand implement is indicated as being rotated clockwise which is the direction to cause upward movement of the glass between the stirring portion of the implement and the wall of the adjacent recess 7. The right hand implement is being rotated counter-clockwise and its spiral thread or projection is of the same hand as that of the other implement so that glass intervening between the implement and the wall of recess 7 will be pumped or impelled downward. In both instances, flow movement of glass longitudinally of the channel between the implements and the adjacent recess walls will be obstructed.

The portions of glass contacted by the stirring heads at their adjacent sides will also be given a movement which is mainly vertical. This glass has greater freedom of movement than the glass between the stirring heads and recess walls since the space intervening between the implements transversely of the forehearth channel is much wider than that of the space between each implement and the wall of the adjacent recess 7. However, when the implements are rotated in opposite directions as shown in Fig. 2, the conjoint result of the vertical pumping of glass by the immersed stirring and impelling heads of the two implements will be to set up a more or less closed transverse circulation and recirculation of glass of the supply stream or body between the implements as indicated by the arrows designated collectively at 25 in Fig. 2. There may, of course, be a forward progression of glass entering into this circulation and recirculation to replace glass fed from the feed spout or otherwise removed from the outer end portion of the forehearth structure. Nevertheless, there will be repeated movements of portions of glass from different levels through glass at other levels of the supply stream or glass body so that portions of glass of different viscosities and temperatures and possibly also of different compositions will be thoroughly commingled and blended. In consequence, the portion of the glass stream or supply body in the portion of the forehearth channel in which the two cooperative stirring and impelling implements are working will be made more nearly uniform in temperature and more homogeneous than the oncoming glass.

The stirring and impelling implements may be positioned at any desired place along the length of the forehearth channel, preferably in a portion thereof known as its "conditioning" or "equalizing" section. This immediately precedes the final or delivery portion of the forehearth from which glass is to be fed through a bottom outlet or otherwise removed. The average temperature throughout a cross-section of the stream or body entering the "conditioning" or equalizing section preferably will be controlled by known heating and/or cooling provisions so as to be about that which is desired for the glass at the feed outlet or other place of removal of glass from the forehearth.

In the structural arrangement shown, the rotary spindles 14 from which the stirring and impelling implements depend are rotated by a drive mechanism similar to that disclosed in my aforesaid Patent No. 2,586,079. Driven sprockets 26 and 27 fast to the upper ends of the left hand and right hand spindles 14, respectively, Fig. 1, are turned in opposite directions about their individual axes by a driving chain 28 engaged with these driven sprockets and a driving sprocket 29 on the upper end of a driven vertical shaft 30. This shaft is mounted in the tubular structure 16 and is driven by a motor unit indicated at 31 in Fig. 2. The driving chain 28 may be kept desirably taut by a sprocket 32 on protecting arm 33 which is supported at the upper end of the tubular supporting structure 16.

Any other suitable known driving mechanism may be employed to rotate the implements and such mechanism may provide in any known manner to rotate the implements both clockwise or counter-clockwise or either in one direction and the other in the opposite direction.

The transverse circulation and recirculation by the cooperation of the stirring and impelling implements coacting with the walls of the recesses in the sides of the forehearth channel will effect substantial equalization of temperature throughout a cross section of the glass as well as making the viscosity and condition of such glass more uniform throughout that cross section. The recesses may have any of various configurations in cross section.

Numerous changes in and modifications of the specific embodiment of the invention shown in the accompanying drawings and particularly described herein will now occur to those skilled in the art and the invention therefore is not to be limited to these precise details.

I claim:

1. Glass blending and homogenizing apparatus for a glass feeder forehearth or the like, comprising a flow channel having side walls and a bottom, said side walls being formed to provide a pair of opposite open lateral recesses extending from the bottom of the channel vertically to a level above the normal level of a stream of molten glass in the channel, a pair of vertically disposed rotary implements having spiral screw threads on their lower end portions, said implements depending from above into said flow channel so that their lower ends are adjacent to and spaced above said bottom and their screw threaded portions are wholly below the normal level of said stream of molten glass and so that the screw threaded portion of one of said implements is located partly in one of said recesses close to but spaced from the wall of the recess and partly in the channel proper and the screw threaded portion of the other implement is similarly located with respect to the recess at the opposite side of the channel, the intervening space across the channel between the adjacent sides of the screw threaded portions of the two implements being free from any obstruction to movement of molten glass therein and being much wider than the space between the wall of either recess and the portion of the implement in such recess, and means to rotate said implements about their respective vertical axes.

2. Apparatus as defined by claim 1 wherein the screw threads on the lower end portions of said implements are of the same hand and the means for rotating the implements about their axes is operable to rotate them in opposite directions so that the glass between one of said implements and the wall of the recess in which such implement is partially received will be impelled upwardly, the glass between the other implement and its adjacent recess wall will be impelled downwardly and a circulatory movement of glass in a transverse vertical plan will be set up in the intervening space between the implements.

3. Apparatus as defined by claim 1 wherein said recesses are substantially semi-circular in cross sectional configuration.

4. Apparatus as defined by claim 1 wherein the walls of said recesses are formed to merge smoothly into the longitudinally extending adjacent portions of the channel side walls so as to obviate any obstruction to flow of glass from the channel proper into the recesses and from the recesses back into the channel.

5. The method of improving the thermal condition and homogeneity of a stream of molten glass flowing through a glass feeder forehearth, comprising the step of conducting the stream of molten glass through a flow channel having side walls and a bottom and having open lateral recesses extending vertically in opposite portions of its side walls from the bottom thereof to a level above that of the stream of glass therein, acting locally on side portions of the glass stream next to the walls of said recesses to impel the glass of said side portions vertically at all levels between the bottom of the channel and the top surface of the stream and in vertical directions to set up a circulatory movement of glass in a transverse vertical section of the stream between the vertically moving portions of glass next to the walls of said recesses and continuously to feed glass thereinto from the vertically impelled portions.

References Cited in the file of this patent

UNITED STATES PATENTS

| | | |
|---|---|---|
| 949,618 | Bugg | Feb. 15, 1910 |
| 1,528,526 | Buckley | Mar. 3, 1925 |
| 2,055,676 | Steward | Sept. 29, 1949 |
| 2,617,636 | Ross | Nov. 11, 1952 |